United States Patent [19]

Imamiya et al.

[11] Patent Number: 5,332,017
[45] Date of Patent: Jul. 26, 1994

[54] PNEUMATIC RADIAL TIRE REINFORCED WITH SINGLE WIRE STEEL CORDS OF SPECIFIC SPIRAL SHAPE

[75] Inventors: Susumu Imamiya; Eiji Igarashi; Hisao Kato; Tomohiko Kogure, all of Hiratsuka, Japan

[73] Assignee: The Yokohama Rubber Co., Ltd., Tokyo, Japan

[21] Appl. No.: 70,914

[22] Filed: Jun. 4, 1993

[30] Foreign Application Priority Data

Jun. 5, 1992 [JP] Japan .................. 4-145446

[51] Int. Cl.⁵ .............. B60C 9/18; B60C 9/20; B60C 9/22
[52] U.S. Cl. .................. 152/527; 152/531
[58] Field of Search .................. 152/526–527, 152/531, 533, 451, 530, 193, 198, 200–202; 57/902

[56] References Cited

U.S. PATENT DOCUMENTS

| | | | |
|---|---|---|---|
| 3,802,982 | 4/1974 | Alderfer | 152/527 X |
| 4,161,203 | 7/1979 | Suzuki et al. | 152/527 |
| 4,172,487 | 10/1979 | Suzuki et al. | 152/527 |
| 4,219,601 | 8/1980 | Inoue et al. | 152/527 X |
| 4,235,274 | 11/1980 | Suzuki et al. | 152/527 |

Primary Examiner—Michael W. Ball
Assistant Examiner—Adrienne C. Johnstone
Attorney, Agent, or Firm—Finnegan, Henderson, Farabow, Garrett & Dunner

[57] ABSTRACT

Pneumatic radial tires for automotive use are constructed with a belt layer reinforced with a steel cord of a unique structure. The steel cord results from the preformation of a single steel wire into a spiral shape meeting specified spiral parameters as determined by specified spiral diameters, specified wire diameters and specified spiral pitches. Significant weight saving is attainable with sufficient driving performance.

5 Claims, 3 Drawing Sheets

PNEUMATIC RADIAL TIRE REINFORCED WITH SINGLE WIRE STEEL CORDS OF SPECIFIC SPIRAL SHAPE

BACKGROUND OF THE INVENTION

1. Technical Field

This invention relates to pneumatic radial tires of steel-belted type for automotive use. More particularly, the invention relates to such a tire having significant weight saving while providing sufficient driveability performance.

2. Prior Art

In harmony with increasing calls for conserving the global environment, moves have recently been growing in the automotive industry to save the per mileage consumption of fuel oils by motor vehicles. One goal is directed, to cope with that trend, toward reducing the weight of pneumatic radial tires. The fuel amount spent by a vehicle is closely associated with the tire weight.

Steel cords are in common use, for their notably higher tensile strength and elastic modulus properties than fiber cords of plastic materials, as reinforcements for belt layers in radial tires. Lightweight radial tires, however, are not easily available with such a steel cord as it is inherently large in specific gravity. No new class of fibrous cords has become known which, from standpoints of mechanical strength, could take the place of the existing steel cords. That leaves automotive tire manufacturers little alternative but to rely on those steel cords in constructing radial tires.

To produce a weight-saving steel-radial tire, a positive attempt is expected to be made with a focus on reducing the number of steel wires fabricated into a steel cord and hence on holding two certain gauges of rubber to an absolute minimum in the tire geometry. One such gauge is the distance or depth between the bottom of grooves defined in a tread and the surface of steel cords embedded in a double-plied belt in close proximity to the groove bottom, and another is the interlaminar spacing between the steel cords disposed in the upper and lower belts. In that instance, the steel cord may be formed by orienting a single straight steel wire, but not by twisting a plurality of steel wires together into an integral structure as commonly accepted in the art. The single-wired steel cord has a smaller cross-sectional area than the multiple-wired twisted counterpart and hence allows the above gauges to be set at as small a level as possible with consequential saving of the quantity of rubber used in a steel-radial tire. Also advantageously, the steel cord so obtained can be completely covered with a coat rubber and hence protected against corrosive fatigue and adhesive failure even in moist condition.

However, the single-wired steel cord is too rigid, due to the steel wire being straight without twist or warp, to be endurable relative to deformation on bending or compression under repeated load. This means that the steel cord tends to break more frequently than the multiple-wired twisted steel cord, resulting in a belt layer of marred durability.

SUMMARY OF THE INVENTION

It has now been found that weight-saving steel-radial tires of desirable driving stability can be attained by the use of a belt layer reinforced with an array of steel cords each of a single steel wire spirally preformed. Such cord structure ensures formation of a belt layer having sufficient durability and eventually of a radial tire having stable driveability.

The present invention, therefore, seeks to provide a novel pneumatic radial tire which is lightweight with use of a specified steel cord of a single-wired type for a belt layer and also satisfactory in respect of driving performance in an extent equal or even greater than the case with a multiple-wired twisted steel cord.

The radial tire according to the invention is well suitable for use in not only passenger cars but heavy-duty buses and trucks as well.

The above and related objects and features of the invention will be better understood from the following description taken in connection with the accompanying drawings.

More specifically, the invention provides a pneumatic radial tire comprising a tread portion, a carcass ply laid to turn about a pair of bead cores, and at least one belt layer reinforced with an array of steel cords and interposed between the tread portion and the carcass ply. Each of the steel cords consists of a single steel wire and is positioned in the belt layer at a predetermined angle with respect to the circumference of the tire. The steel wire is Spirally preformed to meet the structural requirements set for by the equation $$F=(D-d)/P,$$

where
 $0.01 \leq F \leq 0.05$,
 $0.28 \text{ (mm)} \leq d \leq 0.05 \text{ (mm)}$ and
 $2.0 \text{ (mm)} \leq P \leq 8.0 \text{ (mm)}$ wherein F is the determinant parameter of an optimal spiral of the steel wire, D is the diameter or outer circumference of a spiral of the steel wire, measured in a direction perpendicular to the longitudinal direction thereof, d is the diameter of the steel wire, and P is the pitch of the spiral or the longitudinal distance travelled by one complete revolution of the spiral along the length of the steel wire.

DETAILED DESCRIPTION OF THE INVENTION

Figure 1:
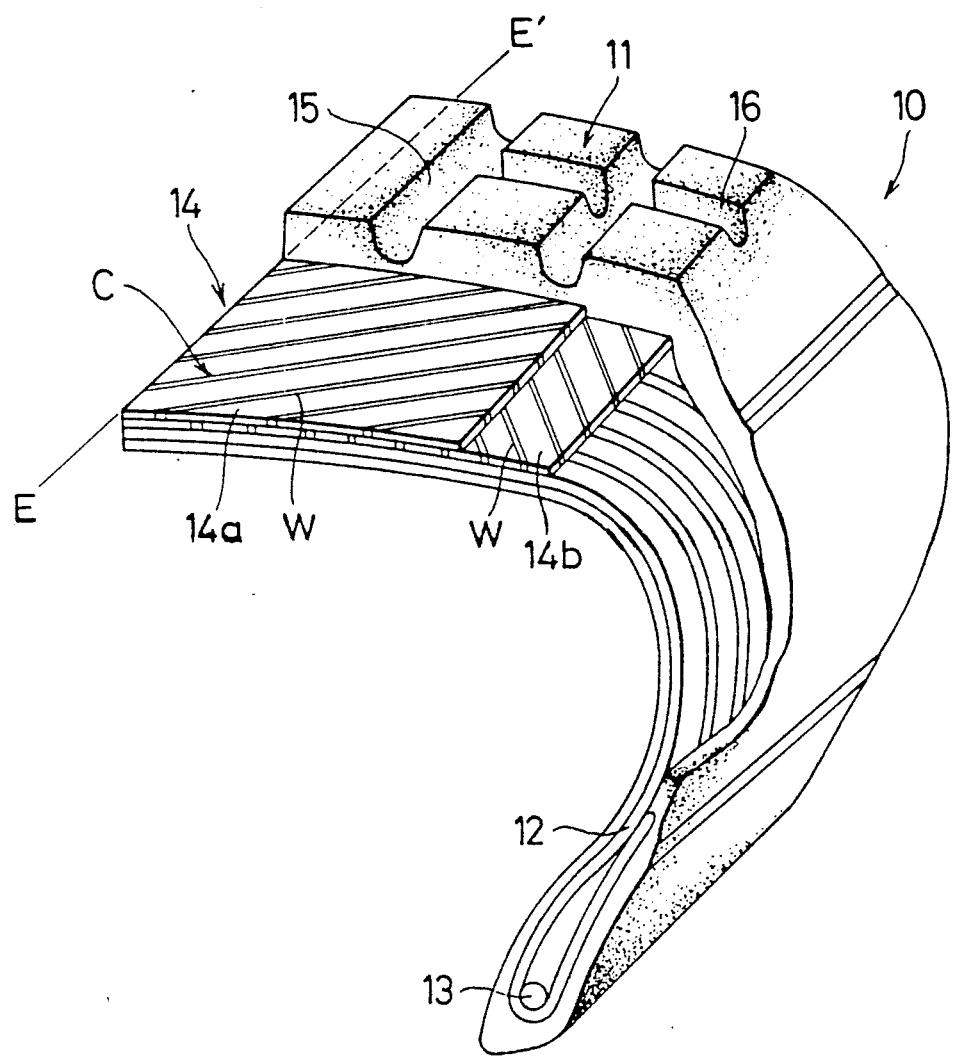
FIG. 1 is a perspective view, partly cut away, of the radial tire provided by the practice of the present invention and shown for example for use in a passenger car.

A pneumatic radial tire contemplated under the present invention is illustrated in the drawings and FIG. 1 in particular. By way of example, the tire designated at 10 in FIG. 1 is designed for use in a passenger car.

The tire 10 is comprised of a tread portion 11 and a carcass ply 12 laid to turn from inside to outside about two opposite bead cores 13, only one of which is shown in FIG. 1. Interposed between the tread 11 and the carcass 12 is a double-plied steel-reinforced belt layer 14 having an outer belt 14a near to the tread 11 and an inner belt 14b near to the carcass 12. Both belts 14a and 14b are held in superimposed relation to each other and disposed peripherally over the carcass 12. When taken along a phantom line E-E' of the tire 10 that is directed circumferentially of the tire as shown in FIG. 1, the belts 14a and 14b are positioned substantially at right angles with respect to the circumference of the carcass 12. A first array of steel cords C is embedded in the outer belt 14a and positioned in crossed or intersected relation to a second array of steel cords C embedded in similar manner in the inner belt 14b. A cross angle of both arrays of the steel cords is usually in the range of 5° to 40° relative to the E-E' line in FIG. 1. The tread 11 has on its outer periphery a tread pattern including a multiplicity of principal grooves 15 and a multiplicity of subsidiary grooves 16. The principal grooves 15 are arranged in spaced apart relation and directed circumferentially of the tire 10, whereas the subsidiary grooves 16 are arranged in spaced apart relation and directed axially of the tire 10.

Figure 2:
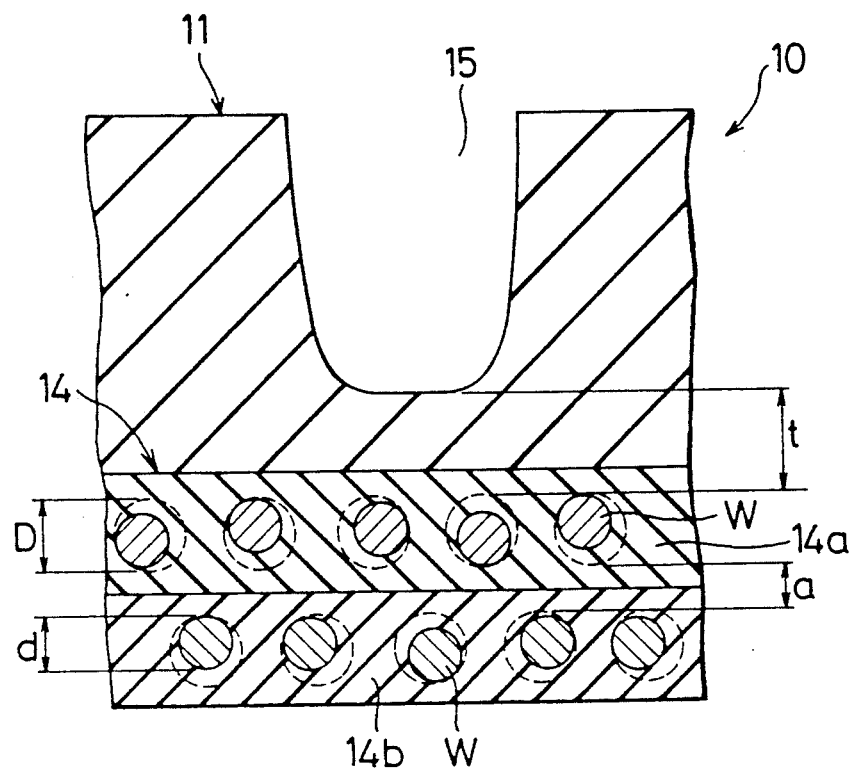
FIG. 2 is a cross-sectional view, partly enlarged, a portion the tire of FIG. 1 to explain the geometric relationships between a tread and a double-plied belt derived from use of an array of steel cords according to the invention.
Figure 3:
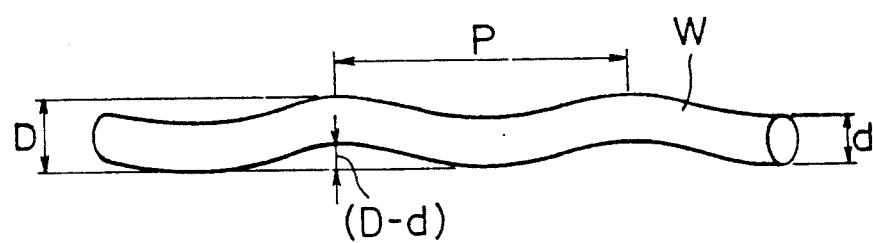
FIG. 3 is a side-elevational view showing a preferred form of a spirally shaped steel wire according to the invention.

The steel cords C according to the invention consist of a single steel wire as better seen in FIG. 2 in which a group of steel wires W is positioned in the outer belt 14a and a similar group of steel wires W in the inward belt 14b. An important feature of the invention resides in preforming each of the steel wires W into a spiral shape. As depicted in FIG. 3, preforming should be done such that the steel wire is shaped to meet the structural requirements of the following equation $$F = (D - d)/P.$$

where
$0.01 \leq F \leq 0.05$,
$0.28 \text{ (mm)} \leq d \leq 0.05 \text{ (mm)}$ and
$2.0 \text{ (mm)} \leq P \leq 8.0 \text{ (mm)}$ wherein F is the determinant parameter of an optimal spiral of the steel wire, D is the diameter of a spiral of the steel wire, d is the diameter of the steel wire, and P is the pitch of the spiral or the longitudinal distance travelled by one complete revolution of the spiral along the length of the steel wire.

In greater detail and with further reference to FIG. 3, the steel wire of a specific diameter d is preformed to with a specific spiral diameter D of a greater dimension than the diameter d and with a specific spiral pitch P. By the diameter D is meant the outer circumference of the spiral of the steel wire measured in a direction perpendicular to the longitudinal direction thereof. The diameter D is shown by the broken line drawn around each steel wire W in FIG. 2. The pitch P denotes the distance travelled by one complete revolution of the spiral along the length of the steel wire.

The single steel wire so shaped is not more rigid or stiff with a mild level of tensile modulus than a straight, unshaped one. This physical change enables the ultimate steel wire to be highly resistant to bending or compression under repeated load and is otherwise remarkably superior in fatigue resistance. As regards such quality, the resulting steel cord is equal to or even greater than a multiple-wired twisted steel cord.

The spiral preforming eligible for the purpose of the invention is determinable by two factors, namely (D−d) or the empty space in a wire spiral between the spiral diameter D and the wire diameter d, and the spiral pitch P. The ratio of (D−d) to P gives the determinant parameter F which serves to define the correlation between fatigue resistance and tensile modulus and in turn between wire durability associated with belt durability and cornering power associated with driving stability. To well balance these physical properties, the determinant parameter F should meet the following equation, $$0.01 \leq F \leq 0.05.$$

Excessive spiral reforming would lead to sharply declining tensile modulus, resulting in a belt layer of reduced durability. This would entail insufficient cornering power and hence fail to match the case with a multiple-wired twisted steel cord in driving stability.

Tabulated below is the relationship between parameter F and fatigue resistance. A spiral shape of $F = 0.01$ is found to be sufficiently resistant to fatigue as compared to a straight one of $F = 0$. Broken wire is nil with $F = 0.04$ or above.

| Parameter F | Fatigue Resistance |
| --- | --- |
| 0 | 100% |
| 0.01 | 80 |
| 0.02 | 20 |
| 0.04 | 0 |
| 0.06 | 0 |
| 0.08 | 0 |
| 0.10 | 0 |

Figure 5:
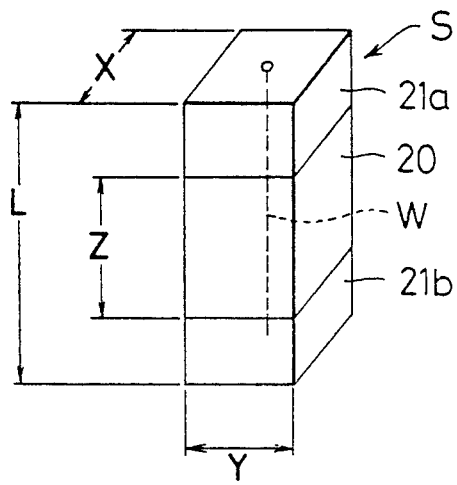
FIG. 5 is a schematic perspective view showing a specimen prepared to examine the fatigue resistance properties of various test steel wires.
Figure 6:
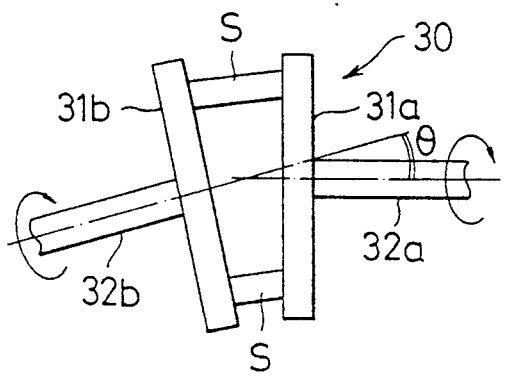
FIG. 6 schematically represents a test device used measure the properties of FIG. 5.

In determining the fatigue resistance stated above, a single steel wire W is embedded in a rubber block and designated at 20 in FIG. 5. Both ends of the steel wire W are held in fixed relation in two opposite brass supports 21a and 21b adhesively bonded to the block 20, after which a specimen S is obtained. The dimensions X, Y & Z of rubber block 20, as shown in FIG. 5, are 12.5 mm; 12.5 mm; and 20.0 mm respectively and the length L of the specimen S is 50.0 mm. Ten such specimens are prepared. By means of a test device depicted at 30 in FIG. 6, the specimens are secured between a pair of rotatable plates 31a and 32b with the revolution axes of those plates set to define an angle of $\theta$ on their extensions in such a manner that the block 20 is subjected to a maximum elongation of 1.5% and a maximum compression strain of 1.5% at every cycle of revolution of the plates 31a and 31b. After completion of $4 \times 10^6$ cycles of revolution, wire breakage is inspected in the specimens. The number of broken wires is expressed by percentage.

Figure 4:
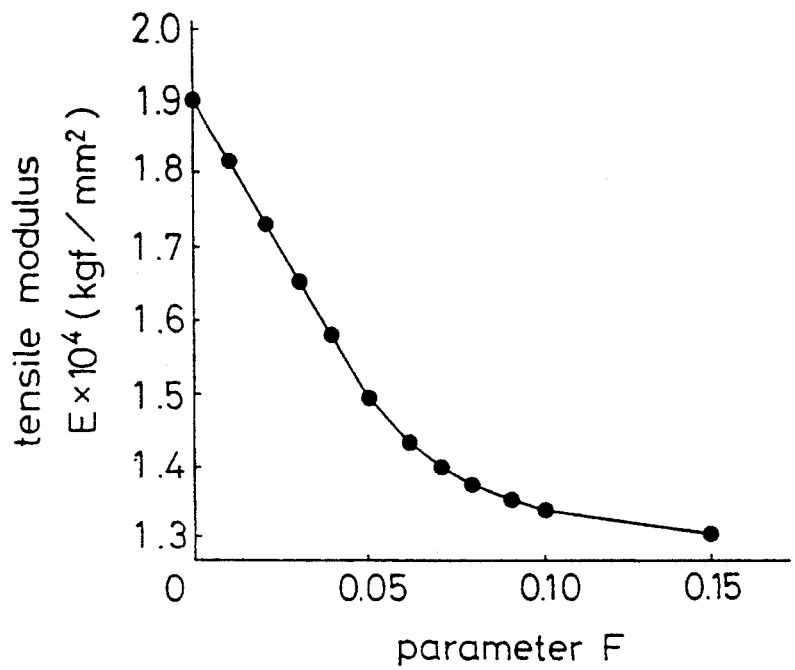
FIG. 4 is a graphic representation of the correlation between parameter F and tensile modulus taken as a measure for determination of an optimal spiral shape of the steel wire shown in FIG. 3.

The graph of FIG. 4 represents the relationship between parameter F and tensile modulus. The larger the parameter F is, the smaller the tensile modulus. To achieve improved cornering power, a steel wire is required to be not less than $1.5 \times 10^4$ kgf/cm² in tensile modulus. From this modulus criticality, $F = 0.05$ should be set as an upper limit of parameter F according to the invention.

The steel wire according to the invention should also comply with the following equations regarding wire diameter d and spiral pitch P, $0.28 \text{ (mm)} \leq d < 0.5 \text{ (mm)}$ and $2.0 \text{ (mm)} \leq P \leq 8.0 \text{ (mm)}$ Here, a wire diameter larger than 0.28 mm and a spiral pitch shorter than 8.0 mm contribute in combination to improved tensile modulus. A wire diameter smaller than 0.5 mm and a spiral pitch longer than 2.0 mm cooperate with each other in enhancing fatigue resistance.

With the specifically spiraled steel wire according to the invention, the resulting steel cord can be completely peripherally protected with a coat rubber so that water-resistant adhesiveness and corrosion resistance are enhanced. Further, the depth or gauge shown at t in FIG. 2 can be held to a small or limited extent. The depth t, called "under-groove bottom gauge" for brevity, measures from the bottom of the principal groove 15 to the upper outer surface of the steel wire W embedded in the outer belt 14a as seen in cross section in FIG. 2. This is due to the fact that the single-wired steel cord has a smaller cross-sectional area and hence saves rubber for use in the outer belt 14a. Similar reasoning is applied to the interlaminar spacing shown at a in FIG. 2. The spacing a, called "cord-to-cord spacing", measures from the outer spiral surface of the steel wire W in the outer belt 14a to the outer spiral surface of the steel wire W in the inner belt 14b. Reduced extents of both the under-groove bottom gauge and the cord-to-cord spacing are conducive to decreased rubber quantity, hence improved weight saving.

The under-groove bottom gauge is preferably in the range of 1.5 to 3.5 mm. The cord-to-cord spacing is preferably from 0.15 to 0.8 mm for passenger cars and from 0.4 to 1.2 mm for buses and trucks.

EXAMPLES

The following examples are given to further illustrate the present invention.

Seven inventive tires hereunder called "IT" and six comparative tires called "CT" were produced with a common set of tire elements indicated below. Testing was conducted with different steel wires varied in their respective structural details as regards wire diameter d, spiral pitch P, spiral parameter F and end counts as tabulated below.
- tire size: 175D/70R13
- carcass: polyester cord of 1,500 D/2
- inner belt width: 120 mm
- outer belt width: 110 mm
- steel cord: all of a single steel wire
- under-groove bottom gauge: 3.5 mm (t in FIG. 2)
- cord-to-cord spacing: 0.64 mm (a in FIG. 2)
- cross angle of both belts: 20° relative to E-E' line (FIG. 1)

A control tire was made to facilitate comparison. The method for CT-1 was followed except that the inner and outer belts were embedded with a steel cord of two steel wires twisted together.
- steel wire diameter: 0.28 mm
- twisted structure: 1×2
- end count: 49 cords/50 mm All the test tires were examined for cornering power associated with driving stability, durability on high-speed driving after moistening, slalom endurance associated with fatigue resistance after moistening, and weight-saving capability. The test procedures were set forth below with the test results as per tabulated.

TEST PROCEDURES

Cornering Power

The test tire after being inflated to an air pressure of 200 kPa (2.0 kg/cm$^2$) was assembled with a 13×5-J rim, followed by travelling at a speed of 10 km/hr on a 1,707.6 mm-diameter drum under a load of 2,942N(300 kgf/cm$^2$). Averaged was the absolute value between the lateral force at a right slip angle of 1° and that at a left slip angle of 1°. Comparison was made by taking the average value of the control tire as a reference index of 100. The larger numerical value, the higher cornering power and the more stable driving.

Durability on High-Speed Driving after Moistening

After being inflated to an air pressure of 220 kPa (2.2 kgf/cm$^2$), the test tire was mounted on a similar rim and let to stand for 30 days in a relative humidity of 98% at 70° C. Travelling was done at an initial speed of 81 km/hr for 2 hours on a similar drum under a load of 4,119N (420 kgf/cm$^2$) and thereafter at a higher speed of 121 km/hr with a subsequent speed rise of 8 km/hr every lapse of 30 minutes. Durability was adjudged by the distance of travel required for the tire to continue to run until any failure took place. Testing was brought to an end when no failure was involved even after travelling for 30 minutes at a speed of 185 km/hr. The control tire was taken as a reference index of 100. The larger numerical figure, the more durable tire.

Slalom Endurance

After being inflated to an air pressure of 170 kPa (1.7 kgf/cm$^2$), the test tire was mounted on a similar rim and exposed to a moist atmosphere as was in the above procedure. Travelling was initiated at a distance of 300 km on a similar drum with a slip angle of 0°±5° and a load of 3,432N (350 kgf/cm$^2$)±2,157N (220 kgf/cm$^2$), while the angle and load factors were varied with a short wave of 0.067 Hz. The tire was cut open to inspect broken steel wire. In the tabulated results, the mark "o" was used to refer to "not broken and acceptable" and "x" to "broken and unacceptable".

Weight Saving

The control tire was taken as a reference weight of 100% on which weight reduction was counted. The smaller numerical figure, the more lightweight tire.

Test Evaluation

Performance evaluation is hereunder made by comparison of IT- and CT-series tires with the control tire in which a double-wired twisted steel cord was embedded in a belt layer of a double-plied construction.

Though satisfactory in respect of cornering power, high-speed durability and weight saving, CT-1 with too small a ratio of spiral parameter F outside the scope of the invention was unacceptable in slalom endurance. CT-2 having too large a parameter showed sufficient slalom endurance but at the same time revealed poor weight saving and cornering power qualities.

IT-1 and IT-2 have proved satisfactory in all respects, gaining weight reduction and improving cornering power, high-speed durability and slalom endurance. IT-3 is substantially favorably comparable, except for a slight decline in cornering power, with the control tire.

Too short a distance of spiral pitch P caused inadequate cornering power as appears clear from CT-3. Too long a pitch, CT-4, showed a sharp decline in high-speed durability and slalom endurance and also failed to attain weight saving.

IT-4 using a shorter pitch within the specified range leads to weight reduction while maintaining the other test qualities at a desired level. A longer pitch near and within the specified upper bound, IT-5, though apt to slightly drop in high-speed durability, is at the same weight level as in the control tire.

IT-6 and IT-7 and CT-5 and CT-6 were provided to examine the effects of varying wire diameters upon weight saving and tire performance. Steel cords substantially of the same weight as that of the control tire were fabricated with their end counts adjusted.

CT-5 of too smaller a diameter departing from the specified range sustained sharply declined high-speed durability and slalom endurance but only in an extent to attain weight saving. CT-6 with too larger a diameter failed to improve high-speed durability and slalom endurance.

A good balance between the test qualities has been attained in IT-6 in which a wire diameter is set at near and within the specified lower limit. While it is slightly low in high-speed durability, IT-7 is virtually comparable in other respects with the control tire.

| Run | Control | CT-1 | IT-1 | IT-2 | IT-3 | CT-2 | IT-4 | CT-3 | IT-5 | CT-4 | IT-6 | CT-5 | IT-7 | CT-6 |
|---|---|---|---|---|---|---|---|---|---|---|---|---|---|---|
| cord structure | 1 × 2 | ← single steel wire → | | | | | | | | | | | | |
| wire diameter d (mm) | 0.28 | 0.40 | 0.40 | 0.40 | 0.40 | 0.40 | 0.40 | 0.40 | 0.40 | 0.40 | 0.28 | 0.25 | 0.48 | 0.55 |
| spiral pitch P (mm) | 14 | 4.0 | 4.0 | 4.0 | 3.0 | 3.0 | 2.0 | 1.5 | 8.0 | 10.0 | 4.0 | 3.0 | 4.0 | 1.0 |
| spiral parameter F | — | 0.006 | 0.01 | 0.03 | 0.05 | 0.06 | 0.03 | 0.03 | 0.02 | 0.02 | 0.03 | 0.03 | 0.01 | 0.01 |
| end count (cord/50 mm) | 49 | 49 | 49 | 49 | 49 | 49 | 49 | 49 | 49 | 49 | 98 | 123 | 34 | 26 |
| weight saving | 100 | 99.1 | 99.2 | 99.8 | 100 | 100.3 | 99.4 | 99.3 | 100 | 100.3 | 98.5 | 97.7 | 99.6 | 100 |
| cornering power | 100 | 100 | 100 | 100 | 98 | 93 | 100 | 100 | 100 | 100 | 100 | 100 | 100 | 100 |
| high-speed durability | 100 | 100 | 100 | 100 | 100 | 100 | 100 | 100 | 95 | 85 | 100 | 85 | 95 | 85 |
| slalom endurance | ○ | x | c | c | c | ○ | ○ | x | ○ | x | ○ | x | ○ | x |

What is claimed is:

1. A pneumatic radial tire comprising a tread portion, a carcass ply laid to turn about a pair of bead cores, and at least one circumferentially extending belt layer reinforced with an array of steel cords and interposed between said tread portion and said carcass ply, each of said steel cords consisting of a single steel wire and positioned in said belt layer at an angle with respect to the circumference of the tire, each of said steel wires being spirally preformed to meet the structural requirements set forth by the equation $$F = (D - d)/P,$$

where
$0.01 \leq F \leq 0.05$,
$0.28 \text{ (mm)} \leq d \leq 0.05 \text{ (mm)}$ and
$2.0 \text{ (mm)} \leq P \leq 8.0 \text{ (mm)}$ wherein F is the determinant parameter of the optimal spiral of said steel wire, D is the diameter of the spiral of said steel wire measured in a direction perpendicular to the longitudinal direction thereof, d is the diameter of said steel wire and P is the pitch of the spiral along the length of said steel wire.

2. The pneumatic radial tire of claim 1, wherein said angle of said steel cords is from 5° to 40°.

3. The pneumatic radial tire of claim 1, comprising an outer belt layer adjacent the tread portion and an inner belt layer adjacent the carcass ply, said belt layers lying adjacent each other and extending circumferentially of the tire, a first array of said steel cords being embedded in said outer layer and a second array of said steel cords being embedded in said inner layer, said first and second arrays crossing each other and positioned at an angle of from 5° to 40° with respect to the circumference of the tire.

4. The pneumatic tire of claim 3, wherein the distance between the bottom of a groove in the tread portion of the tire and the upper outer surface of the spirals of the array of steel cords in the outer belt layer is from 1.5 to 3.5 mm and the spacing between the lower outer surface of the spirals of the array of steel cords in the outer belt layer and the upper outer surface of the spirals of the array of steel cords in the inner belt layer is from 0.15 to 0.8 mm.

5. The pneumatic tire of claim 3, wherein the distance between the bottom of a groove in the tread portion of the tire and the upper outer surface of the spirals of the array of steel cords in the outer belt layer is from 1.5 to 3.5 mm and the spacing between the lower outer surface of the spirals of the array of steel cords in the outer belt layer and the upper outer surface of the spirals of the array of steel cords in the inner belt layer is from 0.4 to 1.2 mm.

* * * * *